United States Patent
Fu

(10) Patent No.: US 10,162,636 B2
(45) Date of Patent: Dec. 25, 2018

(54) CONTROL APPARATUS, INTEGRATED CIRCUIT AND MANAGEMENT METHOD FOR STACK

(71) Applicant: MediaTek Singapore Pte. Ltd., Singapore (SG)

(72) Inventor: Hua Fu, Chengdou (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 232 days.

(21) Appl. No.: 15/345,520

(22) Filed: Nov. 8, 2016

(65) Prior Publication Data

US 2017/0131932 A1 May 11, 2017

(30) Foreign Application Priority Data

Nov. 9, 2015 (CN) .......................... 2015 1 0759670

(51) Int. Cl.
  *G06F 1/32* (2006.01)
  *G06F 3/06* (2006.01)
  *G06F 9/30* (2018.01)
  *G06F 15/78* (2006.01)

(52) U.S. Cl.
  CPC ........ *G06F 9/30101* (2013.01); *G06F 1/3243* (2013.01); *G06F 1/3275* (2013.01); *G06F 3/0604* (2013.01); *G06F 3/0629* (2013.01); *G06F 3/0644* (2013.01); *G06F 3/0688* (2013.01); *G06F 15/7842* (2013.01); *Y02D 10/14* (2018.01)

(58) Field of Classification Search
  CPC .... G06F 1/3243; G06F 1/3275; G06F 3/0604; G06F 3/0629; G06F 3/0644; G06F 3/0688; G06F 9/30101; G06F 15/7842
  See application file for complete search history.

(56) References Cited

U.S. PATENT DOCUMENTS

| 4,405,983 | A | * | 9/1983 | Perez-Mendez | ........ G06F 7/785 711/163 |
| 5,101,486 | A | * | 3/1992 | Okamoto | ............... G06F 9/4484 711/200 |
| 5,107,457 | A | * | 4/1992 | Hayes | ..................... G06F 7/785 711/132 |
| 5,835,958 | A | * | 11/1998 | Long | ..................... G06F 9/4486 711/170 |

* cited by examiner

*Primary Examiner* — Benjamin P Geib
(74) *Attorney, Agent, or Firm* — Winston Hsu

(57) ABSTRACT

A control apparatus, an integrated circuit, and a management method for a stack are provided. The management method for the stack includes: obtaining an instruction of running a task with a first function; changing a pointer of the stack in an internal memory from pointing to an internal memory to an external memory before executing the first function, wherein the stack in the internal memory is used by the task; executing the first function, wherein first temporary information that is needed to be stored during a period of executing the first function is stored into the external memory pointed to by the pointer of stack; and adjusting the pointer of the stack to point to the internal memory after finishing executing the first function. According to the above-mentioned management method for the stack, the cost is reduced, and low power consumption can be achieved.

17 Claims, 10 Drawing Sheets

| Task | Size of Stack |
|---|---|
| task 1 | 2KB |
| task 2 | 3KB |
| task 3 | 4KB |

FIG. 2

CONTROL APPARATUS, INTEGRATED CIRCUIT AND MANAGEMENT METHOD FOR STACK

BACKGROUND

Field of the Invention

The present invention relates to the field of embedded technology, and more particularly, to a control apparatus, an integrated circuit, and a management method for a stack.

Description of the Prior Art

The current embedded system, especially the embedded system with firmware running thereon, is typically used with a host system to achieve specific or singular function, while the current embedded system is also required to have features such as low power consumption, low cost, etc. This type of embedded system is usually arranged to run a simpler operating system (OS).

With the development of practical demands, for example, the development demands of smartphones or wearable devices, there are increasing needs for embedded systems that are capable of operating independently and achieving complete functions, such as GPS (Global Positioning System) position calculating function, gait recognition function, etc., so that the main system can stay in a hibernate/sleep state as often as possible.

Therefore, the embedded system needs to have certain capability of executing generic application software. When the generic application software is executed, it needs to store local variables into a stack in an internal memory. Because size of the internal memory is generally small, size of the stack is accordingly small (e.g., 4 kb) and is not allowed to exceed the predetermined range. As a result, an overflow resulting from insufficient stack size will occur at the time of executing certain generic application software.

In order to solve the problem, some conventional techniques have been proposed to directly expand the capacity of the internal memory. If a program code used for initializing a stack is already programmed in a read only memory (ROM), the size of the stack still cannot be increased even though the capacity of the internal memory has been expanded. In addition, the cost of embedded system increases greatly due to the capacity expansion of the internal memory.

SUMMARY

The present invention embodiment provides a control apparatus, integrated circuit, and management method for a stack, which can solve the problem of increased cost.

According to one aspect of the present invention, there is provided a management method for task stack, including: obtaining an instruction of running a task with a first function; changing a pointer of the stack in an internal memory from pointing to the internal memory to pointing to an external memory before executing the first function, wherein the stack in the internal memory is used by the task; executing the first function, wherein first temporary information needed to be stored during a period of executing the first function is stored into the external memory pointed to by the pointer of the stack; and adjusting the pointer of the stack to point to the internal memory after finishing executing the first function.

According to another aspect of the present invention, there is provided an integrated circuit including a microcontroller. The microcontroller includes an internal memory and a processor. The processor is arranged to obtain an instruction of running a task with a first function, change a pointer of a stack in the internal memory of the microcontroller from pointing to the internal memory to pointing to an external memory before executing the first function, execute the first function, output first temporary information needed to be stored during a period of executing the first function, and adjust the pointer of the stack to point to the internal memory after finishing executing the first function, wherein the first temporary information is stored into the external memory pointed to by the pointer of the stack.

According to another aspect of the present invention, there is provided a control apparatus including the integrated circuit described above and an external memory, wherein the external memory is arranged to store first temporary information needed to be stored during a period of executing a first function.

Several beneficial effects are offered by the present invention. The present invention embodiment changes a pointer of a stack in an internal memory from pointing to an internal memory to pointing to an external before executing a first function, and stores first temporary information that is needed to be stored during the period of executing the first function into the external memory, rather than a stack of the internal memory. Hence, there is no need to change the size of the stack and to directly expand the capacity of the internal memory. Accordingly, the cost is decreased consequently.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

In order to clearly illustrate the technical solutions of the embodiments of the present invention, the drawings accompanying the description of the embodiments of the present invention are briefly described as follows. Obviously, the given accompanying drawings only show some embodiments of the present invention. Those skilled in the art could get other drawings in accordance with the given accompanying drawings without devoting a creative work.

FIG. 2 is a diagram illustrating the tasks and corresponding sizes of stacks shown in FIG. 1.

DETAILED DESCRIPTION

With reference to the accompanying drawings, the technical solutions of the embodiments of the present invention are described clearly and completely as follows. Obviously, the given embodiments are only some embodiments of the present invention, but not all embodiments of the present invention. Based on the embodiments of the present invention, all other embodiments which can be obtained without a creative work made by those skilled in the art should be deemed to fall within the scope of the present invention.

Figure 1:
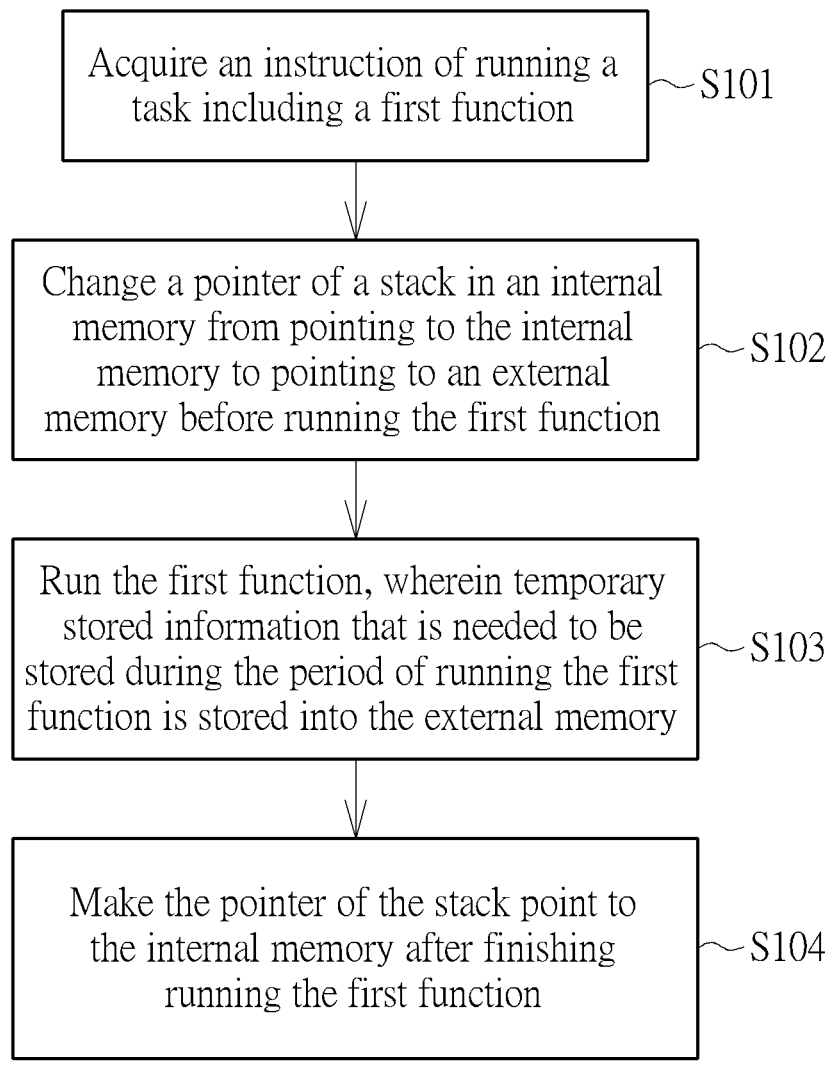
FIG. 1 is a flowchart illustrating a management method for a stack according to an embodiment of the present invention.

Please refer to FIG. 1, which is a flowchart of a management method for a stack according to the present invention. As shown in FIG. 1, the management method for a stack provided in this embodiment can be applied to an embedded system. The management method for a stack can be performed by a microcontroller unit (MCU), and includes the following steps.

S101: Obtain an instruction of running a task, wherein the task comprises a first function.

The operating system (OS) of MCU can run multiple tasks simultaneously, wherein each task uses its own corresponding stack to store temporary information needed to be stored when running the task, wherein the stack is a part memory area in an internal memory, and physical addresses of the stack can be either continuous or discontinuous, and the internal memory may be a Random access memory (RAM). A size of stack cannot exceed a predefined size when the stack is being used. As shown in FIG. 2, it is supposed that the predefined sizes of the three stacks are 2 KB, 3 KB, and 4 KB, respectively. For example, a task 1 uses a stack having a size of 2 KB to store data. Hence, temporary information with a size of 2 KB can be stored into the stack at the most when running the task 1. If the size of temporary information needed to be stored is 3 KB when running the task 1, stack overflow occurs and possibly causes destruction of key data because the size of temporary information exceeds the predefined size of 2 KB.

Temporary information that is needed to be stored may include local variables generated by executing a corresponding function (e.g. a first function), and may further include input parameters of the corresponding function and return values of the corresponding function. A first function may comprise one function that is needed to be invoked (called) by MCU. When the number of parameters of said function exceeds a certain number (usually, 4) or said function employs variable parameters, these parameters received by the first function may be put into an external memory. In general, when a function returns, the function may has only one direct return value and the size of the return value is smaller than or equals to storage space size of one register or the function has no return value. If there is only one direct return value, the direct return value is stored in a generic register0 of MCU without occupying a stack. If the return value of the function is a structure, and a size of the return value is larger than storage space size of one register, the return value may be put into a stack or an external memory.

In an embodiment of the present invention, an instruction of running a task may be achieved by employing one of the following ways. In an implementation, a host receives an instruction requested by a user for executing a task, loads code of the task into MCU, and sends an instruction to MCU for indicating to execute the task. Accordingly, MCU receives the instruction from the host. In another implementation, MCU receives an instruction triggered by a user for running a task via external input equipment. In another implementation, MCU connects to a network, a user at a remote end sends an instruction of running a task, and MCU receives the instruction. In another implementation, a predetermined time is preset to trigger an execution of a task, and a timer sends out a triggering instruction when the predetermined time is reached. In this manner, an operation of running a task is triggered by the triggering instruction sent by the timer.

S102: Change a pointer of a stack in an internal memory from pointing to the internal memory to pointing to an external memory before executing the first function, wherein the stack is used by the task.

In this embodiment and the following embodiments, an operator can estimate in advance that how large a storage space is needed to store the temporary information that is needed to be stored during the period of executing the first function. If the storage space that is needed to store the temporary information is larger than a predefined size of a stack, then a code segment is added in front of the first function. The code segment instructs to change the pointer of the stack from pointing to the internal memory to pointing to the external memory.

Alternately, according to the function needed to be executed, MCU may determine dynamically how large a storage space is needed to store the temporary information during the period of executing the function. If the storage space that is needed to store the temporary information for executing the first function is larger than a predefined size of a stack, then the pointer of the stack is changed from pointing to the internal memory to pointing to the external memory.

Specifically, the pointer of the stack points to a certain address of the internal memory. When initializing a stack, the operating system (OS) determines an initial address of a stack pointer, i.e. an address of an internal memory initially pointed to by the stack pointer. In this step, if the first function is an initial function in the task, then the location of the internal memory pointed to by the stack pointer is the initial address of the stack pointer. If the first function is not an initial function in the task, then the location of the internal memory pointed to by the stack pointer is an address of the internal memory that is currently pointed to by the stack pointer. Making the pointer of the stack in the internal memory point to an external memory, specifically, is to make the pointer of the stack point to a specific address of an external memory, wherein the specific address may be predetermined or may be set in response to a request issued from MCU to a host. Optionally, making the pointer of the stack in the internal memory point to an external memory may not need to point to a specific address of the external memory, but only point to the external memory.

S103: Execute the first function, wherein temporary information that is needed to be stored during the period of executing the first function is stored into the external memory.

For example, a local variable generated during the period of executing the first function, an input parameter of the first function, and/or a return value of the first function are stored into the external memory.

S104: Adjust the pointer of the stack to point to the internal memory after finishing executing the first function.

In this step, the pointer of the stack is arranged to point to the internal memory after the executing operation of the first function is finished, such that the space in the external memory that is occupied by the temporary information can be released, and other temporary information, which is needed to be stored during the period of executing subsequent functions of the task, can be stored into the stack.

It is noted that, assuming the first function is one function that is needed to be invoked (called) by MCU, if the number of input parameters of the function exceeds a certain number, then these parameters may be put into an external memory for the function to access. In a case where a return value of the function is a structure, because the returned structure is located on an external memory, it is needed that the returned structure is copied from the external memory to the stack in the internal memory before releasing the space of the external memory that is occupied by temporary information, and then the pointer of the stack is arranged to point to the internal memory. In another case where a return value of the function is only a direct return value (size of return value<=storage space size of one register), then the return value is stored directly into a certain generic register of MCU rather than stored into a stack or an external memory, wherein the certain generic register is usually generic register 0.

The following will take two tasks, i.e. task1 and task2, as examples for detailed description.

Figure 3:
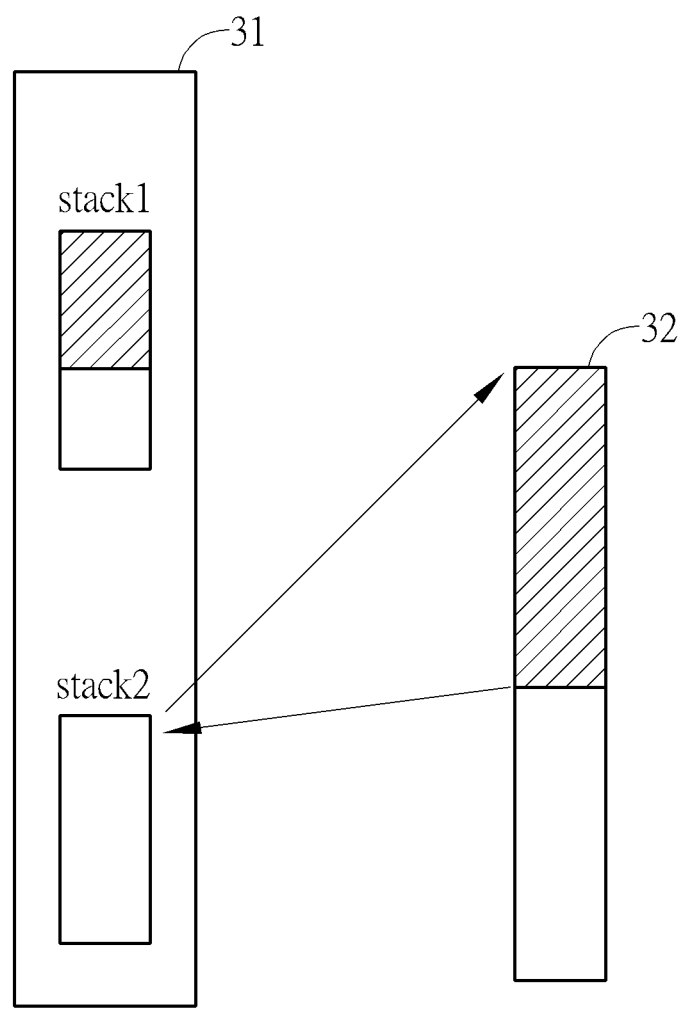
FIG. 3 is a diagram illustrating a pointer of a stack that switches between an internal memory and an external memory shown in FIG. 1.

As shown in FIG. 3, the stack used by task1 is stack1 in the internal memory 31, the stack used by task2 is stack2 in the internal memory 31, and task2 includes a first function. The pointer of stack2 in the internal memory 31 is changed from pointing to the internal memory 31 to pointing to the external memory 32 after task1 is finished. Then, the first function of task2 is executed, wherein temporary information needed to be stored during the period of executing the first function is stored into the external memory 32. After the first function of task2 is finished, the pointer of stack2 is controlled to point to the internal memory 31, and the space in the external memory 32 that is occupied by the temporary information is released.

Before a first function is execute, a pointer of the stack in the internal memory is changed from pointing to the internal memory to pointing to an external such that temporary information that is needed to be stored during the period of executing the first function is stored into the external memory. So, there is no need to change the size of the stack and to expand the capacity of the internal memory, and the cost is decreased consequently.

Figure 4A:
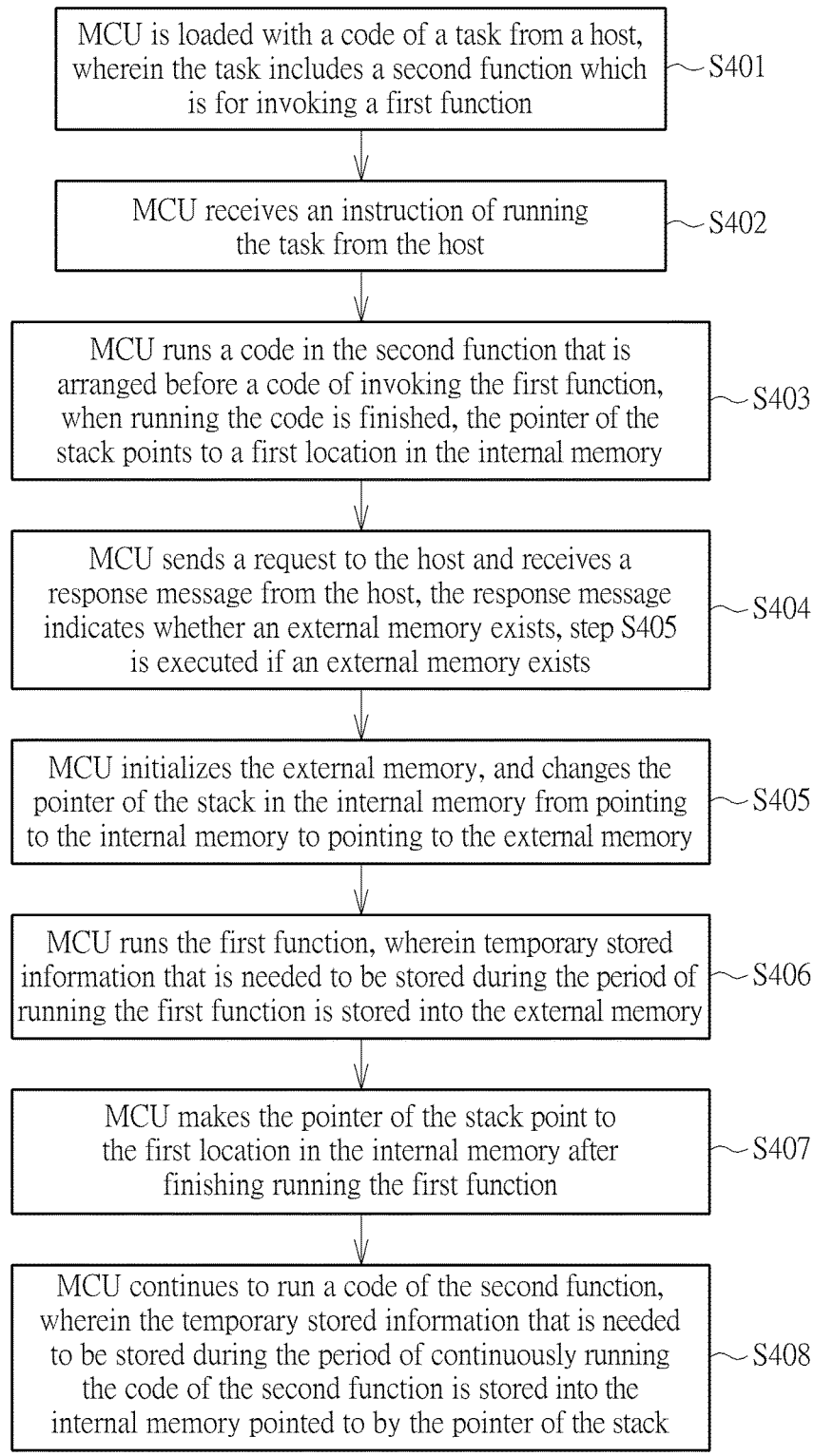
FIG. 4A is a flowchart illustrating a management method for a stack according to another embodiment of the present invention.

Referring to FIG. 4A, the present invention provides a management method for a stack which is described on the basis of the management method for a stack shown in FIG. 1. The method includes following steps.

S401: MCU is loaded with a code of a task from a host, wherein the task includes a second function which is for calling (invoking) a first function.

The second function may be a management function, and the first function may be a specific function to be executed, such as a GPS positioning function.

S402: The host sends an instruction to MCU for instructing MCU to run the task, and MCU receives the instruction.

S403: MCU executes a first code of the second function, wherein the first code is arranged to execute before invoking the first function. MCU stores temporary information that is needed to be stored during the period of executing the first code into the internal memory currently pointed to by a pointer of a stack used by the task. When finishing executing the first code of the second function that is arranged before invoking the first function and before executing the first function, the pointer of the stack points to a first location in the internal memory.

Between step S402 and step S403, MCU may initialize one or more globe variables of the first function.

S404: MCU sends a request to the host to request for checking whether an external memory exists, and receives a response message from the host. The response message indicates whether an external memory exists. If an external memory exists, step S405 is executed; otherwise, this flow ends.

S405: MCU initializes the external memory, and changes the pointer of the stack from pointing to the internal memory to pointing to the external memory.

Initialization of the external memory may include a process of the MCU applying to host for a usable space in the external memory. The process includes: MCU sends a request to a main processor in the host to request for allocating a usable space in the external memory; the main processor in the host allocates a usable space in the external memory for MCU, and notifies the MCU, wherein the usable space in the external memory is arranged to store temporary information needed to be stored during the period of executing the first function, and the usable space includes: an initial address of the external memory and a storage space size of the external memory. For example, the initial address is 0010H, and the storage space size is 0522 KB. Optionally, the initial address of the external memory and the storage space size of the external memory may be preconfigured, and thus the pointer of the stack in this step points directly to the preconfigured initial address of the external memory.

S406: MCU executes the first function, wherein temporary information that is needed to be stored during the period of executing the first function is stored into the external memory.

In this step, MCU sends the temporary information that is needed to be stored during the period of executing the first function to the main processor in the host, and then the main processor in the host transfers the temporary information to the external memory.

Optionally, in another embodiment, after allocating a usable space in the external memory for MCU, the main processor in a host merely notifies the MCU that the space allocation is successful, but does not notify the MCU of which section in the external memory is the specific usable space. At this moment, the pointer of the stack in this step merely points to the external memory, rather than a certain address of the external memory. In this step, the temporary information that is needed to be stored during the period of executing the first function is sent to the main processor by MCU, and the main processor in the host will perform a store operation of the temporary information according to a pre-allocated space in the external memory.

S407: MCU adjusts the pointer of the stack to point to the first location in the internal memory after finishing executing the first function. MCU sends a message to the main processor for notifying the main processor to release the usable space in the external memory.

For example, the first function is one function that is needed to be invoked (called) by MCU. If a return value of the function is only a direct return value (size of return value<=size of one register), then the return value is stored directly into the generic register0 of MCU rather than stored into a stack or an external memory, and thus the pointer of the stack in this step can re-point to the first location in the internal memory.

S408: MCU continues to execute the code of the second function, wherein the temporary information that is needed to be stored during the period of continuously executing the code of the second function is stored into the internal memory pointed to by the pointer of the stack.

The following will take two tasks, i.e. task1 and task2, as examples for detailed description.

Figure 4B:
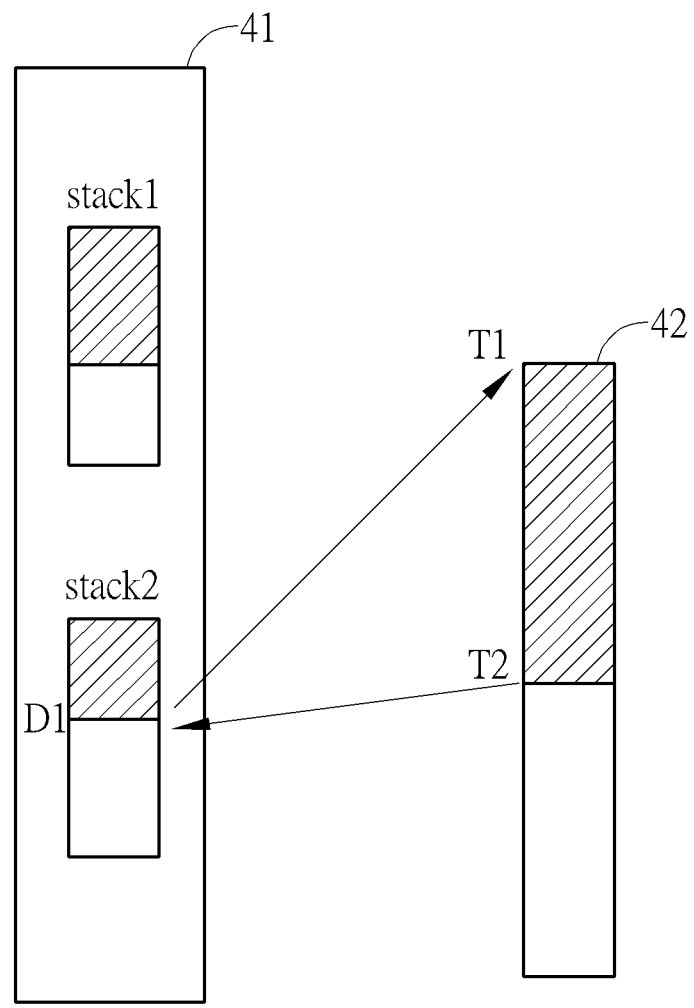
FIG. 4B is a diagram illustrating a pointer of a stack that switches between an internal memory and an external memory in a management method for a stack shown in FIG. 4A.

As shown in FIG. 4B, the stack used by task1 is stack1 in the internal memory 41, the stack used by task2 is stack2 in the internal memory 41, and task2 includes a second function which invokes a first function. First of all, a first code of the second function, which is arranged to execute before invoking the first function, is executed, and temporary information that is needed to be stored during the period of executing the first code of the second function is stored into the internal memory 41 currently pointed by a pointer of stack2. Then, after the execution of the first code of the second function, which is arranged to execute before invoking the first function, is finished, the pointer of stack2 points to the first location D1 in the internal memory 41. Next, the external memory 42 is initialized, and the pointer of stack2 in the internal memory 41 is changed from pointing to the internal memory 41 to pointing to the external memory 42. The first function of task2 is executed, wherein temporary information that is needed to be stored during the period of executing the first function is stored into the external memory 42, e.g., stored into the space from the first location T1 to the second location T2 in the external memory 42, wherein the first location T1 is the initial address of the external memory 41 pointed to by the pointer of stack2. After the executing operation of the first function of task2, the pointer of stack2 is pointed to the internal memory 41. Specially, after the invoking operation of the first function is finished, the pointer of stack2 is adjusted to point to the first location D1 in the internal memory 41. In addition, the space in the external memory 42 occupied by the temporary information is released.

An embodiment of the present invention switches a stack to an external memory before executing a first function invoked by a second function in a task, and switches the stack back to an internal memory after finishing executing the first function, wherein the other parts of the second function still use the stack to store temporary information (such as local variables) such that the execution speed of the task is faster. In this manner, not only can a faster execution speed of the task be guaranteed, but also stack overflow can be avoided. Further, when there is no need to use the external memory for storage, the main processor will be notified to release the allocated usable space in the external memory, so as to prevent the space in the external memory from being always occupied.

Figure 5:
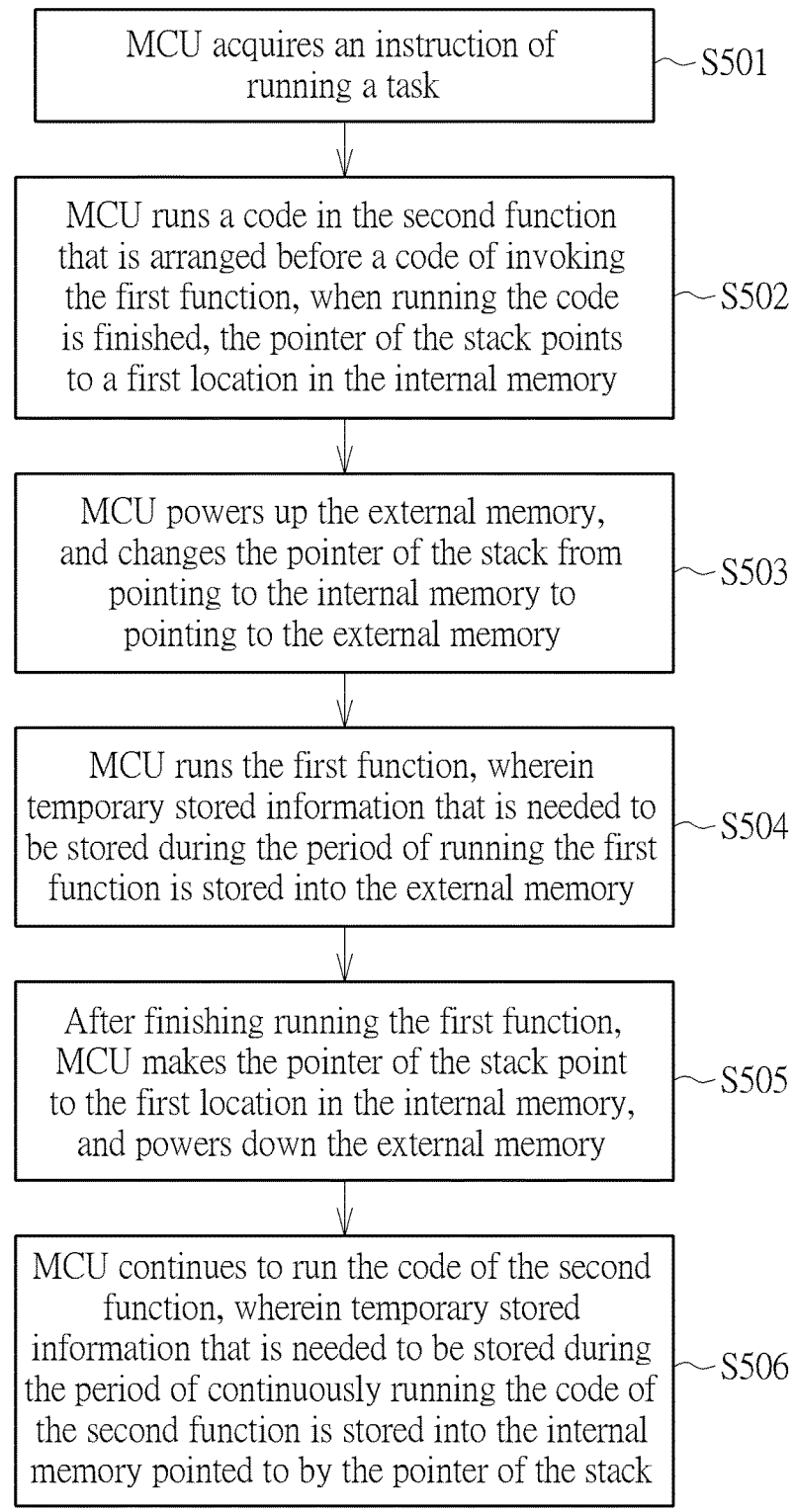
FIG. 5 is a flowchart illustrating a management method for a stack according to another embodiment of the present disclosure.

Referring to FIG. 5, the present invention further provides a management method for a stack. In this embodiment, an external memory is attached (or added) to MCU, wherein the external memory is adopted only for specific items in which MCU executes specific functions. Referring to FIG. 5, the embodiment includes following steps.

S501: MCU obtains an instruction of running a task.

The way that MCU obtains an instruction of running a task is the same as that described in step S101, and is not repeated herein for brevity.

A code of the task may be stored in a non-volatile memory which can be integrated into MCU or located outside MCU.

S502: MCU executes a first code of the second function that is arranged to executing before invoking the first function, and stores temporary information that is needed to be stored during the period of executing the first code into the internal memory currently pointed to by a pointer of a stack used by the task. When the execution of the first code is finished, the pointer of the stack is pointed to a first location in the internal memory.

Before proceeding with step S502, MCU may initialize one or more globe variables of the first function.

S503: MCU powers on the external memory, and changes the pointer of the stack from pointing to the internal memory to pointing to the external memory.

If the external memory is a double data rate synchronous dynamic random access memory (DDR SDRAM), the step further includes: performing a corresponding parameter configuration for the memory.

S504: MCU executes the first function, wherein temporary information that is needed to be stored during the period of executing the first function is stored into the external memory.

S505: After finishing executing the first function, MCU adjusts the pointer of the stack to point to the internal memory, and powers off the external memory.

S506: MCU continues to execute the code of the second function, wherein temporary information that is needed to be stored during the period of continuously executing the code of the second function is stored into the internal memory pointed to by the pointer of the stack.

The embodiment of the present invention not only guarantees a faster execution speed of task but also avoids stack overflow. In addition, the embodiment of the present invention powers on an external memory when it is needed to use the external memory for storing temporary information, and makes a pointer of a stack re-point to an internal memory after finishing executing the corresponding function, thus allowing the external memory to be powered off. In this manner, low power consumption is achieved.

The present invention further provides a management method for a stack. The main difference between the management method and the embodiment shown in FIG. 4A is that a first function and a second function are two consecutive functions in a task, i.e. the task includes a first function and a second function following the first function. In this embodiment, a pointer of a stack is controlled to point to a first location in an internal memory after the execution of the first function is finished. The first location in the internal memory may be the initial address of the stack pointer, wherein the initial address of the stack pointer is determined at the time when the operating system (OS) initializes the stack. That is, the first location in the internal memory is an address of the internal memory that is initially pointed to by the stack pointer, i.e., the starting location of the stack. Next, the second function is executed, and temporary information that is needed to be stored during the period of executing the second function is sequentially stored at the first location and subsequent locations of the internal memory. Optionally, the first function may also be executed after the second function without influencing the implementation of the present invention.

The following will take two tasks, i.e. task1 and task2, as examples for detailed description.

Figure 6:
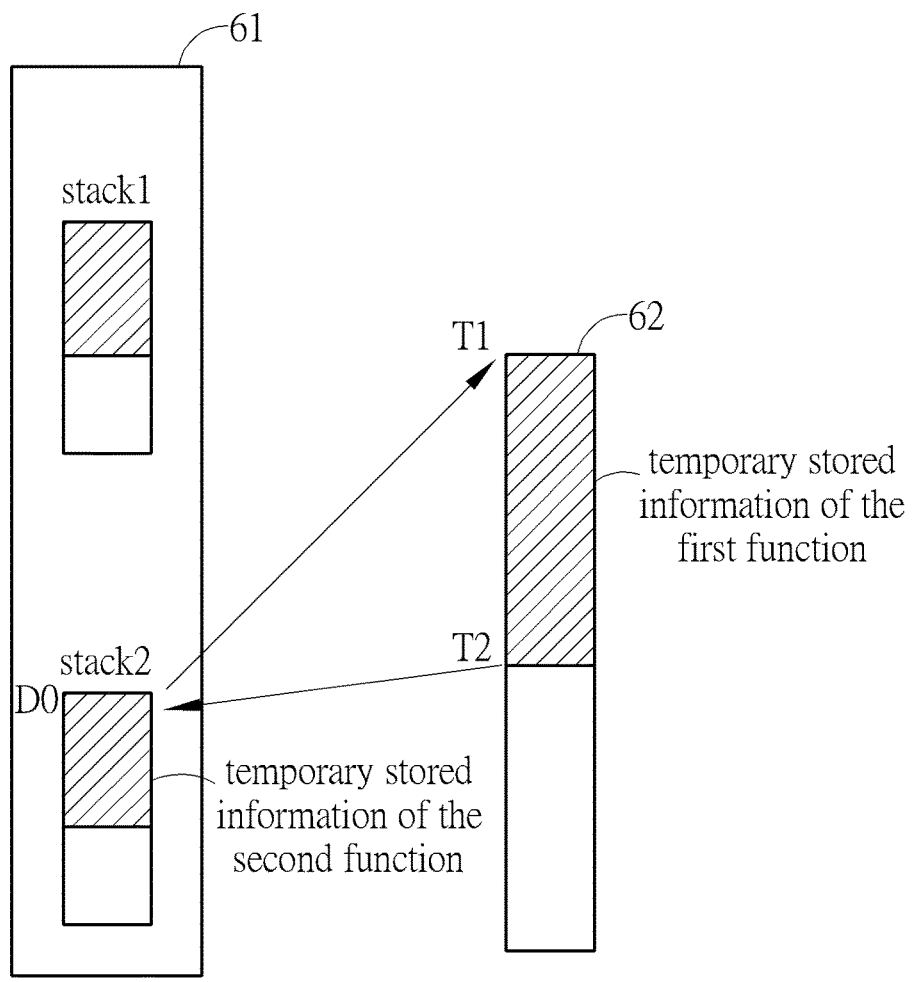
FIG. 6 is a diagram illustrating a pointer of a stack that switches between an internal memory and an external memory in a management method for a stack according to the present disclosure.

As shown in FIG. 6, the stack used by task1 is stack1 in the internal memory 61, the stack used by task2 is stack2 in the internal memory 61, and task2 includes a first function. When it is needed to run task2, the external memory 62 is initialized, and the pointer of stack2 in the internal memory 61 is changed from pointing to the first location D0 in the internal memory 61 to pointing to the external memory 62. Then, the first function of task2 is executed, wherein temporary information that is needed to be stored during the period of executing the first function is stored into the external memory 62, such as being stored into the space between the first location T1 and the second location T2 in the external memory 62. After the execution of the first function of task2 is finished, the pointer of stack2 is controlled to re-point to the first location D0 in the internal memory 61 (i.e. the starting location of the stack), and the space in the external memory 62 occupied by the temporary information is released, and the external memory 62 is powered off. Next, the second function is executed, and temporary information that is needed to be stored during the period of executing the second function is sequentially stored at the first location D0 and subsequent locations of the internal memory 61.

The present invention further provides an integrated circuit with a microcontroller. The microcontroller obtains an instruction of running a task with a first function, wherein concerning the way of obtaining an instruction of running a task and associated introduction of a stack, they can be readily known by referring to the description of the above method embodiment, and is not repeated herein for brevity. Because a stack used by the microcontroller at the time of executing a first function exceeds a predetermined size of the stack, the microcontroller changes the pointer of the stack in an internal memory from pointing to the internal memory to pointing to an external memory for avoiding stack overflow.

The microcontroller executes the first function, wherein temporary information that is needed to be stored during the period of executing the first function is stored into the external memory, and the temporary information may include local variables, and may further include output parameters and return values.

The microcontroller adjusts the pointer of the stack to point to the internal memory after finishing executing the first function.

The present embodiment adopts a microcontroller for changing a pointer of a stack in an internal memory from pointing to the internal memory to pointing to an external memory before executing a first function, and storing temporary information that is needed to be stored during the period of executing the first function into the external memory. So, there is no need to change the size of the stack and to expand the capacity of the internal memory, such that the cost is decreased consequently.

Figure 7:
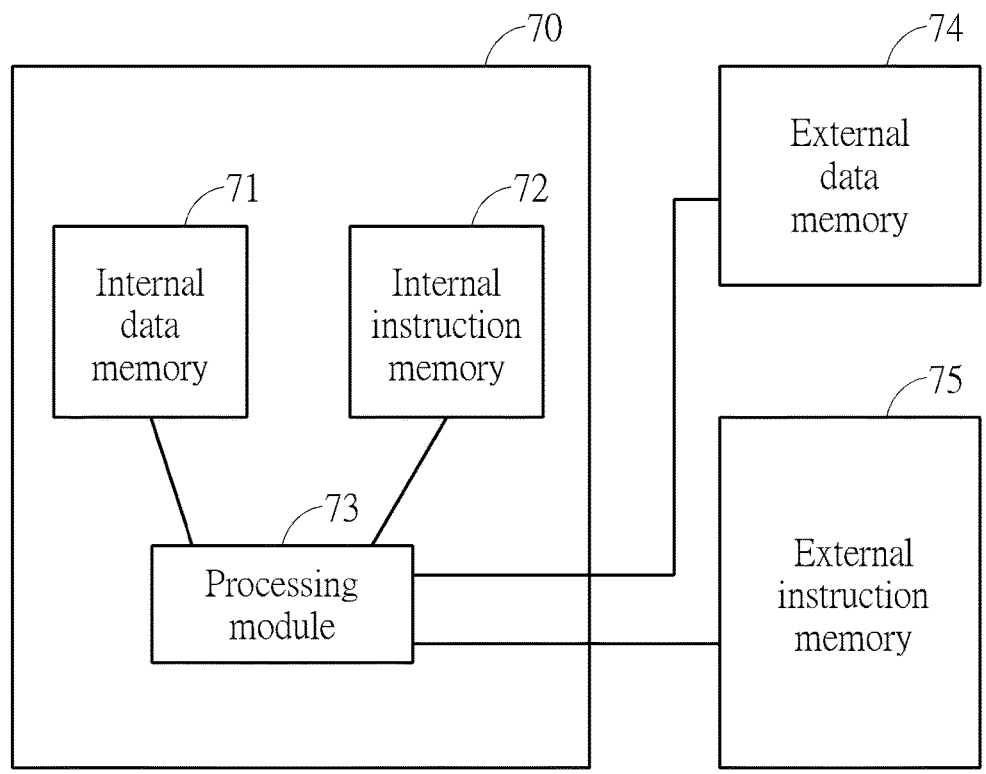
FIG. 7 is a diagram illustrating a structure of a microcontroller according to the present disclosure.

Referring to FIG. 7, the present invention further provides an integrated circuit, and the integrated circuit may be a microcontroller 70. As shown in FIG. 7, the microcontroller 70 includes: an internal data memory 71 and a processor 73. The microcontroller 70 further includes an internal instruction memory 72. For the purpose of more clearly describing the present invention, an external data memory 74 (such as DDR/SRAM) and an external instruction memory 75 are further drawn on the outside of the microcontroller 70, wherein the external instruction memory 75 may be a non-volatile memory, such as a Flash memory. The internal memory in other embodiments of the present invention is referred to as the internal data memory, and the external memory in other embodiments of the present invention is referred to as the external data memory. The internal memory in the present disclosure may be a random access memory (RAM). The processor may be a core of MCU.

The internal data memory 71 includes a plurality of stacks. Each of a plurality of tasks run by the microcontroller 70 uses the corresponding stack, respectively. A code of a task (such as the code of the first function) may be pre-burned (or solidified) in the internal instruction memory 72, or may be stored into the external memory 75. For example, for a scheme without the external instruction memory 75, the code of the first function is put into the internal instruction memory 72.

The processor 73 of the microcontroller 70 obtains an instruction of running a task, and changes the pointer of a stack from pointing to the internal memory to pointing to the external memory before executing the first function of the task, and stores temporary information that is needed to be stored during the period of executing the first function into the external memory, and adjusts the pointer of the stack to point to the internal memory after finishing executing the first function. Concerning a specific operation of the processor 73, it can be readily known by referring to the corresponding description of the above method embodiment, and is not repeated herein for brevity.

In a specific embodiment, the external data memory 75 is an attached memory for the microcontroller 70, wherein the external data memory 75 is adopted only for a specific item in which a specific function is executed. In this kind of application scenario, the external data memory 75 is powered on when it is needed to use the external data memory 75 for storing temporary information; otherwise, the external data memory is powered off to decrease power consumption. Therefore, the microcontroller 70 controls the external data memory 75 to be powered on before executing a first function, and controls the external data memory 75 to be powered off after finishing executing the first function such that the power consumption is decreased.

The present invention provides an integrated circuit 80 according to the present disclosure, and the integrated circuit 80 includes a main processor 81 and a microcontroller 82, wherein the microcontroller 82 includes an internal memory 83 and a processor 84. Under this circumstance, the microcontroller 82 and the main processor 81 share the external memory 88 which is attached on the main processor 81.

The processor 84 of the microcontroller 82 obtains an instruction of running a task with a first function, wherein concerning the way of obtaining an instruction of running a task and the associated introduction of the stack, they can be readily known by referring to the description of the above method embodiment, and are not repeated herein for brevity. Because a stack used by the microcontroller at the time of executing a first function exceeds the predetermined size of the stack, the microcontroller changes a pointer of the stack in the internal memory 83 from pointing to the internal memory 83 to pointing to the external memory 88 for avoiding stack overflow.

The processor 84 of the microcontroller 82 executes the first function, wherein temporary information that is needed to be stored during the period of executing the first function is stored into the external memory 88.

The processor 84 of the microcontroller 82 adjusts the pointer of the stack to point to the internal memory 83 after finishing executing the first function.

Alternatively, the processor 84 of the microcontroller 82 is further arranged to send a request to the main processor 81 to request for allocating a usable space in the external memory 88. The main processor 81 allocates the usable space in the external memory 88 for the microcontroller 82, and notifies the microcontroller 82, wherein the usable space in the external memory 88 is arranged to store the temporary information needed to be stored during the period of executing the first function. Optionally, the usable space in the external memory 88 may be pre-configured. For example, a pre-configuration of a usable space in an external memory includes: an initial address of the external memory (e.g.

0010H) and a storage space size (e.g. 512 KB) are pre-configured for the usable space. Next, the processor 84 of the microcontroller 82 sends the temporary information that is needed to be stored during the period of executing the first function to the main processor 81. Next, the main processor 81 transfers the temporary information to the external memory 88. Next, the pointer of the stack is changed from pointing to the external memory 88 to pointing to the internal memory 83 after the execution of the first function is finished, and the usable space in the external memory 88 is released. Optionally, the processor 84 of the microcontroller 82 may further send a request to the main processor 81 to request for checking whether an external memory exists, and receive a response message sent by the main processor 81. The response message indicates whether an external memory exists. If an external memory exists, the first function will be executed; otherwise, this flow ends. Optionally, the processor 84 of the microcontroller 82 can further load a code of a task via the main processor 81. Optionally, the processor 84 of the microcontroller 82 can further receive an instruction of running a task via the main processor 81. The processor 84 of the microcontroller 82 can further obtain a code of a task and an instruction of running a task via other ways without influencing the implementation of the present invention.

In an alternative embodiment, a task further includes a second function which is for invoking a first function. Before changing a pointer of a stack from pointing to an internal memory to pointing to an external memory, the processor is further arranged to execute a first code of the second function that is arranged to execute before invoking the first function, and store temporary information that is needed to be stored during the period of executing the first code into the internal memory pointed to by a current pointer of the stack. The pointer of the stack is pointed to a first location in the internal memory when the microcontroller finishes executing the first code of the second function. Then the processor executes the first function, and adjusts the pointer of the stack to point to the first location in the internal memory after finishing executing the first function.

In this embodiment, the present invention switches a stack to an external memory before executing a first function invoked by a second function in a task, and switches the stack back to an internal memory after finishing the first function. The other part of the second function still uses the stack in the internal memory to store local variables such that the execution speed of the task is faster. In this manner, not only can the faster execution speed of the task be guaranteed, but also stack overflow can be avoided.

In an alternative embodiment, the task further includes a second function which is subsequent to a first function. The processor makes the pointer of the stack point to a first location in an external memory after finishing executing the first function. The processor continues to execute the second function, and temporary information generated by the second function is sequentially stored at the first location and subsequent locations in the internal memory.

In this embodiment, when a task is executed, temporary information generated by one part of functions in a task is stored into an external memory, and temporary information generated by the other part of the functions in the task is stored into an internal memory. In this manner, not only can the faster execution speed of task be guaranteed, but also stack overflow can be avoided.

Figure 8:
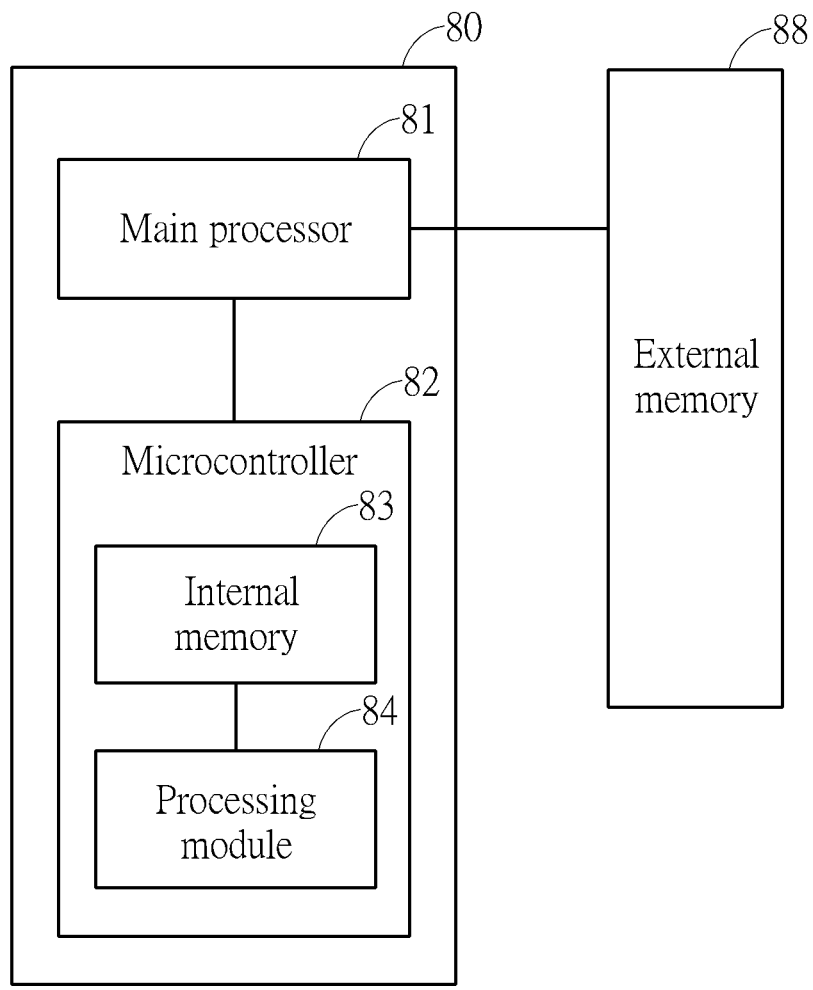
FIG. 8 is a structure diagram of an integrated circuit provided by the present disclosure.

The present invention further provides a control apparatus which includes an integrated circuit and an external memory. The integrated circuit may be a microcontroller, and a specific structure thereof is shown in FIG. 7. Alternatively, the integrated circuit may have a main processor and a microcontroller integrated therein, and a specific structure thereof is shown in FIG. 8. Concerning the specific operation of the integrated circuit, it can be readily known by referring to the description of the above-mentioned integrated circuits and management method for the stack, and is not repeated herein for brevity. The external memory may be attached on the microcontroller or attached on the main processor, and is arranged to store temporary information generated at the time of executing functions.

Figure 9:
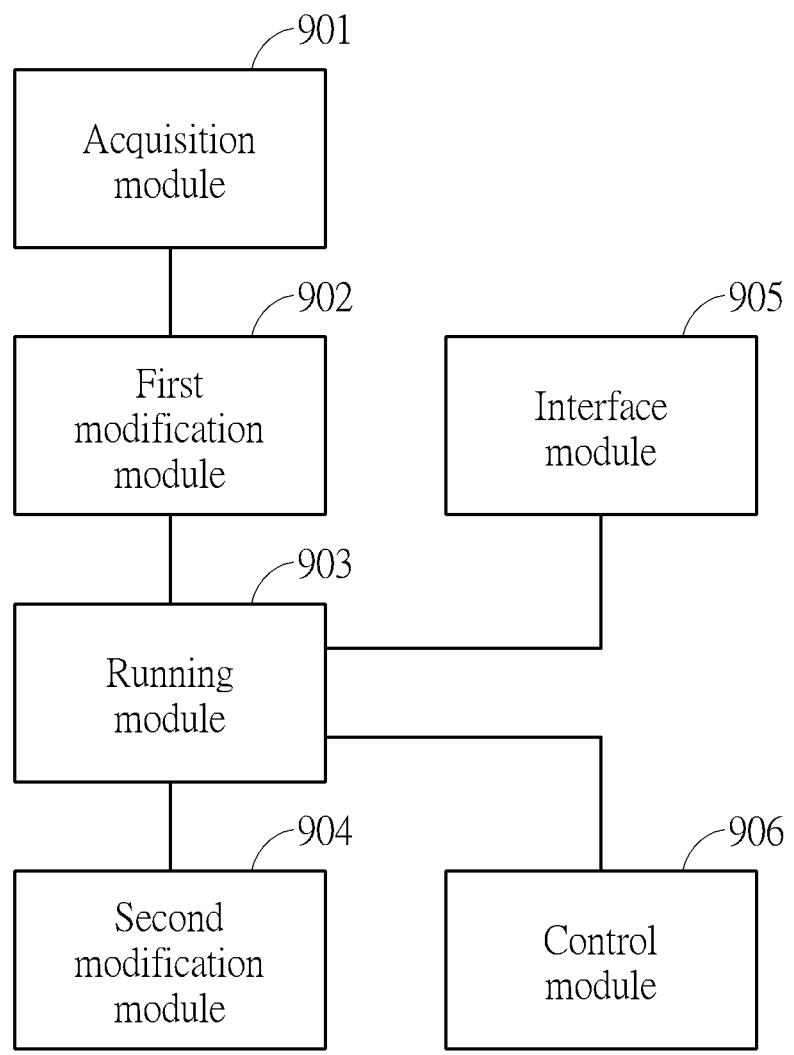
FIG. 9 is a structure diagram of a control apparatus provided by the present disclosure.

Referring to FIG. 9, the present invention further provides a control apparatus including: an obtaining module 901, arranged to obtain an instruction of running a task with a first function; a first modification module 902, arranged to change a pointer of a stack in an internal memory from pointing to the internal memory to pointing to an external memory before the first function is executed, wherein the stack in the internal memory is used by the task; a executing module 903, arranged to execute the first function, wherein temporary information that is needed to be stored during the period of executing the first function is stored into the external memory pointed to by the pointer of the stack, and the temporary information includes local variables; and a second modification module 904, arranged to adjust the pointer of the stack to point to the internal memory after the execution of the first function is finished.

The task includes a second function arranged to invoke the first function. The executing module 903 is further arranged to execute a first code of the second function that is arranged to execute before invoking the first function, and store temporary information that is needed to be stored during the period of executing the first code of the second function into the internal memory currently pointed to by a pointer of the stack. Next, when the execution of the first code is finished, the pointer of the stack points to a first location in the internal memory. The second modification 904 is arranged to make the pointer of the stack re-point to the first location in the internal memory after the execution of the first function is finished.

In order to communicate with the main processor, the control apparatus further includes an interface module 905, arranged to send a request to the main processor to request for allocating a usable space in the external memory, and receive a notification message sent by the main processor. The notification message indicates the usable space in the external memory allocated by the main processor. The usable space in the external memory is arranged to store the temporary information needed to be stored during the period of executing the first function. Furthermore, interface module 905 is further arranged to send a message to the main processor for notifying the main processor to release the space used for storing the temporary information in the external memory.

In order to control the external memory, the control apparatus further includes a control module 906, arranged to control the external memory to be powered on before the first function is executed, and control the external memory to be powered off after the execution of the first function is finished.

In summary, the present invention changes a pointer of a stack in an internal memory from pointing to an internal memory to pointing to an external before a first function is executed, and stores temporary information that is needed to be stored during the period of executing the first function into the external memory. Hence, there is no need to change stack size and to expand the capacity of internal memory, such that the cost is decreased consequently. Further, when a task is running, the temporary information of one function is stored into a stack in an internal memory, and the temporary information of another function is stored into an external memory. In this manner, not only can the faster execution speed of the task be guaranteed, but stack overflow can be avoided. Further, an external memory is powered on when it is needed to use the external memory for storing temporary information; otherwise, the external memory is powered off to achieve low power consumption. Further, when a task is transplanted between platforms, for example, from a non-embedded platform (e.g., Windows platform) to MCU, temporary information generated during the time of running the task can be stored into an external memory without being stored into a stack of an internal memory as described by the present invention. Hence, the transplantation is easily achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A management method for a stack, comprising:
    obtaining an instruction of running a task with a first function;
    changing a pointer of the stack in an internal memory from pointing to the internal memory to pointing to an external memory before executing the first function, wherein the stack in the internal memory is used by the task;
    executing the first function, wherein first temporary information needed to be stored during a period of executing the first function is stored into the external memory pointed to by the pointer of the stack; and
    adjusting the pointer of the stack to point to the internal memory after finishing executing the first function.

2. The management method for the stack of claim 1, wherein the task further comprises a second function arranged to invoke the first function, and before changing the pointer of the stack from pointing to the internal memory to pointing to the external memory, the management method further comprises:
    executing a first code of the second function that is arranged to execute before invoking the first function, and storing second temporary information needed to be stored during a period of executing the first code of the second function into a location of the internal memory currently pointed to by the pointer;
    wherein the pointer points to a first location in the internal memory when finishing executing the first code of the second function;
    wherein the step of adjusting the pointer to point to the internal memory after finishing executing the first function comprises:
    adjusting the pointer of the stack to point to the first location in the internal memory after finishing executing the first function.

3. The management method for the stack of claim 1, wherein the task further comprises a second function subsequent to the first function;
    the step of adjusting the pointer of the stack to point to the internal memory after finishing executing the first function comprises:
    adjusting the pointer of the stack to point to a first location in the internal memory after finishing executing the first function;
    the management method further comprises:
    executing the second function, wherein third temporary information needed to be stored during a period of executing the second function is sequentially stored in the internal memory from the first location of the internal memory.

4. The management method for the stack of claim 1, wherein the management method is executed by a microcontroller, and the management method further comprises:
    the microcontroller receiving a code of the first function from a main processor, or
    a code of the first function being burned in an erasable non-volatile memory of the microcontroller.

5. The management method for the stack of claim 1, wherein the management method is executed by a microcontroller, the internal memory is located inside the microcontroller and comprises a plurality of stacks, and each of a plurality of tasks run in parallel by the microcontroller uses a corresponding one of the plurality of stacks, respectively.

6. The management method for the stack of claim 1, further comprising:
    sending a request to a main processor to request for allocating a usable space in the external memory; and
    receiving a notification message sent by the main processor, wherein the notification message indicates the usable space in the external memory allocated by the main processor, wherein the usable space in the external memory is arranged to store the first temporary information.

7. The management method for the stack of claim 1, wherein the management method is executed by a microcontroller having the external memory attached thereon;
    the management method further comprises:
    powering on the external memory before executing the first function; and
    powering off the external memory after finishing executing the first function.

8. The management method for the stack of claim 1, wherein after finishing executing the first function, the management method further comprises:
    sending a message to a main processor for notifying the main processor to release a space in the external memory storing the first temporary information.

9. An integrated circuit comprising:
    a microcontroller, comprising:
        an internal memory and a processor;
        wherein the processor is configured to obtain an instruction of running a task with a first function, change a pointer of a stack in the internal memory from pointing to the internal memory to pointing to an external memory before executing the first function, execute the first function, output first temporary information needed to be stored during a period of executing the first function, and adjust the pointer of the stack to point to the internal memory after finishing executing the first function, wherein the first temporary information is stored into the external memory pointed to by the pointer of the stack.

10. The integrated circuit of claim 9, wherein the internal memory comprises a plurality of stacks, and each of a plurality of tasks run in parallel by the microcontroller uses a corresponding one of the plurality of stacks, respectively.

11. The integrated circuit of claim 9, wherein the task further comprises a second function arranged to invoke the first function; the processor is further arranged to execute a first code of the second function that is arranged to execute before invoking the first function, and store second temporary information that is needed to be stored during a period of executing the first code of the second function into a location of the internal memory currently pointed to by the pointer, wherein when finishing executing the first code of the second function, the pointer points to the first location in the internal memory.

12. The integrated circuit of claim 11, wherein the processor adjusts the pointer to point to the first location in the internal memory after finishing executing the first function.

13. The integrated circuit of claim 9, wherein the processor is further arranged to send a request to a main processor to request for allocating a usable space in the external memory, receive a notification message sent by the main processor, wherein the notification message indicates the usable space in the external memory allocated by the main processor, and the usable space in the external memory is arranged to store the first temporary information needed to be stored during the period of executing the first function.

14. The integrated circuit of claim 9, wherein the processor is further arranged to send a message to a main processor for notifying the main processor to release a space in the external memory storing the first temporary information.

15. The integrated circuit of claim 14, wherein the main processor is integrated into the integrated circuit.

16. The integrated circuit of claim 9, wherein the processor is further arranged to control the external memory to be powered on before executing the first function, and to control the external memory to be powered off after finishing executing the first function.

17. A control apparatus, comprising:
   the integrated circuit of claim 9 and an external memory;
   wherein the external memory is configured to store the first temporary information needed to be stored during the period of executing the first function.

* * * * *